3,413,854
GRAVIMETER
Anton Graf, Lochham, near Munich, Germany, assignor to Continental Elektroindustrie A.G. Askania-Werke, Berlin-Mariendorf, Germany, a corporation of Germany
Continuation of application Ser. No. 423,422, Jan. 5, 1965. This application Aug. 29, 1967, Ser. No. 664,212
Claims priority, application Germany, Jan. 8, 1964, G 39,562
3 Claims. (Cl. 73—382)

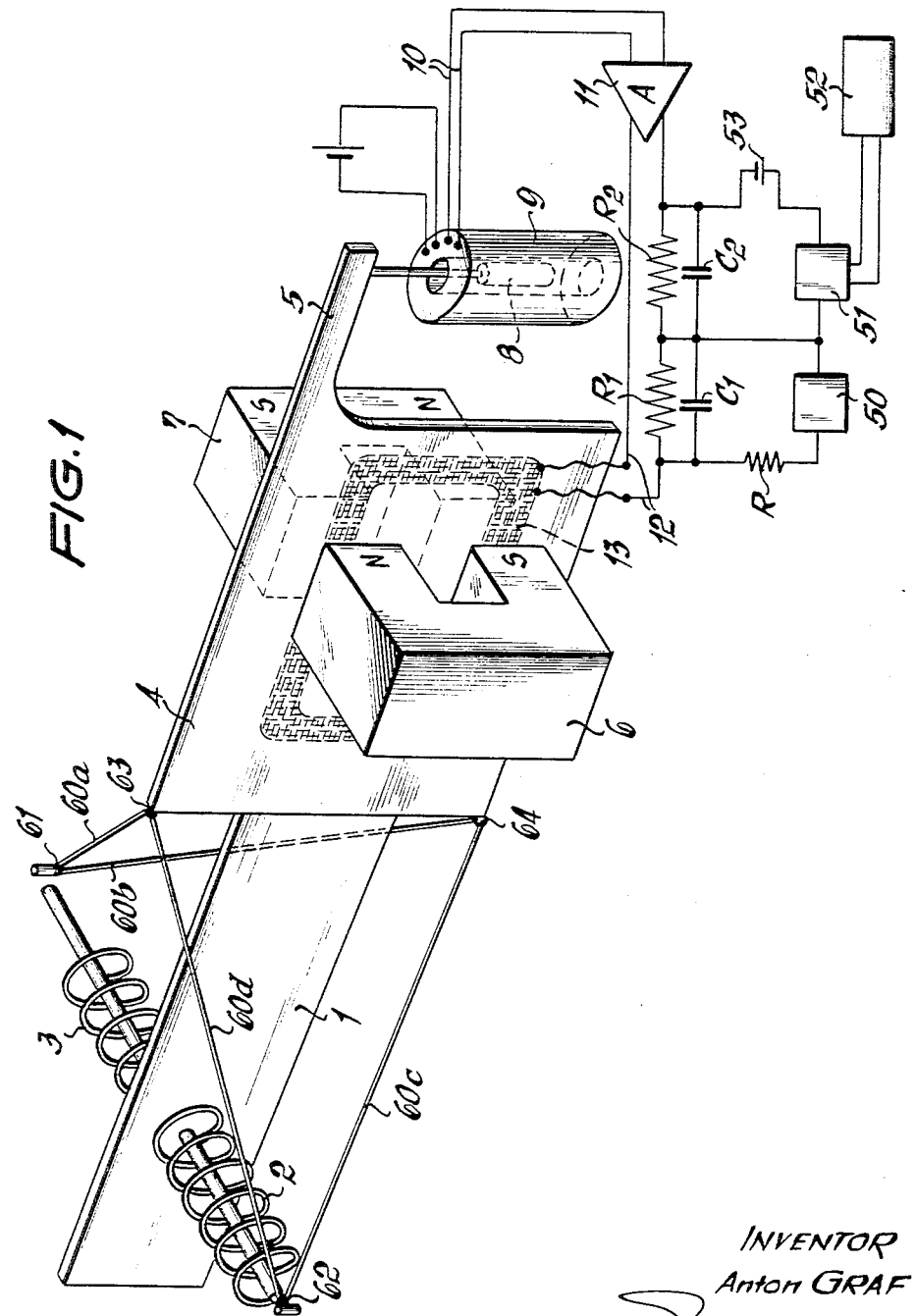

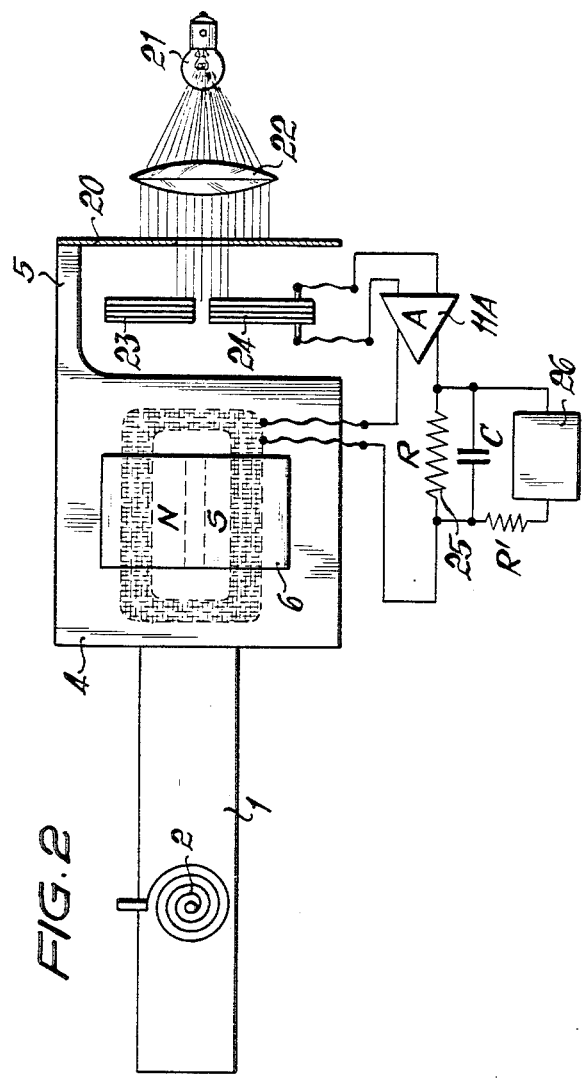

ABSTRACT OF THE DISCLOSURE

A gravimeter mass is pivoted and restrained for movement in a vertical plane about a horizontal axis and has an electrically conducting but non-magnetic portion located in a permanent magnetic field so that the movements of the mass are speed-proportionally damped by eddy currents induced in that portion. The same mass portion carries a winding energized by reversible direct current from an amplifier which is controlled in response to positional departure of the mass from a given null reference position. The amplifier output also furnishes a measure of the change in gravity acting upon the mass.

---

This is a continuation of my copending application Ser. No. 423,422, filed Jan. 5, 1965, for Gravimeter, claiming a right of priority based upon German application G 39,562 filed abroad Jan. 8, 1964.

This invention relates to gravimeters for measuring the force of gravity on rocking or similarly moving objects, for instance on boats, airplanes or satellites.

Gravimeters are in general highly sensitive spring balances employing a spring system by which an indicator body or "gravimeter mass" is flexibly mounted. In elementary constructions, when the force of gravity changes, the body deflects by a small amount with respect to the base or support, the deflection serving to measure the change of the force of gravity. The relative motion is measured either visually or, by use of an appropriate motion transducer, electrically.

In measuring the force of gravity with a gravimeter located so that the base or support itself is in motion, any substantial acceleration of the site is superimposed on the gravity change in the relative deflection, due to inertia of the indicator. Such acceleration is frequently more or less periodic and sometimes has values corresponding to very large multiples of the change in the force of gravity sought to be measured.

Measuring under such conditions has been heretofore carried out by mechanically damping the indication weight in such a manner that it undergoes only an amplitude of relative motion of a few millimeters and measuring the relative motion by means of an electrical transducer, with a high time constant circuit further aiding in discriminating against the spurious deflections caused by acceleration of the base, as in U.S. Patent 3,019,655 of the present inventor. Assuming the mechanical damping attenuation in the gravimeter is 1:150 and that of a voltmeter used for the electrical measurement is 1:200, the total damping attenuation is 1:30000. Therefore, a periodic oscillation with a maximum acceleration of ±150 gal. (1 gal.=1 cm./s.²) is recorded by the recording instrument with an amplitude of only ±5 milligal.

This method has the disadvantages that it is period-dependent (long periods receive less damping than short ones) and causes very long stabilizing times of the measured values. In the above-mentioned example, it is desirable to allow 40 to 50 minutes for reaching of equilibrium. If the boat or other moving support changes its course or its speed in a manner somehow producing a transient non-oscillatory spurious vertical acceleration of the gravimeter mass, it is thus necessary to wait almost an hour until a measurement can be made.

Similarly, a considerable space interval may occur between the place of a gravity change and the place of readability of the recording, especially when the measurements are made in airplanes or other fast-moving vehicles.

In order to minimize this disadvantage, an arrangement has been developed (disclosed in the copending application of Schulze et al., filed July 26, 1962, Ser. No. 212,516 now abandoned, and their continuation-in-part application filed Aug. 23, 1965, Ser. No. 483,022) which constantly returns the indicator to its zero or null position by means of a servomotor and a very yielding or sensitive spring. The reading of the change of gravity is then taken from the state of expansion or contraction of the spring. This arrangement has the advantage of reducing the above-mentioned phase or time lag by reducing the amplitude of motion of the weight; however, it is found that this arrangement does not fully solve the problem since the weight still moves appreciably from its zero position to actuate the servomotor and thus the long settling-down time is not fully eliminated. Furthermore, this remaining motion can cause a "cross-coupling" effect when the vertical and the horizontal craft accelerations have the same frequency and are in a given phase relation to each other.

In accordance with the teachings of the present invention, there is employed in a gravimeter of the general type described above a construction in which the movable mass or weight is, upon deflection, urged toward its zero or null position by an electrically controlled force field (i.e., a force acting through the non-contacting agency of a "field"), without any mechanical elements introducing delay or inertia effects in the application of the compensating force, the current (or voltage) producing the field which is needed to hold the mass serving at the same time to measure the change of the force of gravity, thus eliminating the necessity of any mechanical drive and essentially eliminating all motion of the weight. The fields which may practically be employed are, of course, electrically produced and include electromagnetic and electrostatic fields. The invention may accordingly also be described as a construction in which an electrical quantity, produced as a function of the position of the gravimeter mass and variable with the position of the mass, electrically generates a force field which produces directly— without adjustment of a spring or other mechanical device—a force which acts against the motion of the mass and holds it substantially in the fixed position, so that the electrical quantity is a measure of the forces acting on the mass.

The basic teachings of the invention, together with further structure and improvements taught thereby, will best be understood from the embodiments of the invention illustrated in the accompanying drawing, in which:

FIGURES 1 and 2 are more or less diagrammatic representations of gravimeter structures made in accordance with the invention.

In FIGURE 1, the numeral 1 indicates a gravimeter mass or body which is mounted on a horizontal axis of rotation by means of torsion springs 2 and 3. As described in the above-mentioned patent of the present inventor, the mass 1 is disposed in a vertical plane constrained by wires 60a through 60d, secured at 61, 62, 63, 64, so that it can move only in its plane under the effect of accelerative forces. On its outer end is a plate 4, of electrically conductive nonmagnetic material. This plate has an extension 5. The plate 4 is movably mounted in the air gap between opposed permanent magnets 6 and 7, which cooperate with the plate 4 to produce speed-proportional electromagnetic eddy-current damping for the movements of the body 1.

The extension 5 of the mass or body is rigidly connected with the movably arranged iron rod or core 8 of a differential transformer 9. The iron rod 8 controls the amplitude of the alternating voltage output from the transformer 9 to output lines 10. The voltage has a fixed frequency, for instance 100 kilocycles. The alternating voltage disappears at a given position of the iron core 8 and thus at a given position of the gravimeter mass 1, namely at the zero or null reference position. When the iron rod 8 passes through this position the phase angle of the ouput voltage of the transformer 9 changes by 180°.

The alternating voltage of the line 10 is amplified in an amplifier 11 and phase-sensitively rectified at the output. A direct current flows through the lines 12 to the winding of a coil 13 on the mass between the magnets 6 and 7. The direct current at 12 thus disappears in the zero position of the scale balance 1 and reverses its direction of flow when the scale balance passes through this position.

The polarity of the current is such that the force produced by the stationary magnets and the magnet formed by coil 13 acts opposite the direction of deflection. Voltage drops across the resistors $R_1$ and $R_2$ are recorded either in analog form by means of a millivolt recorder 50 which is damped by a long time constant circuit $RC_1$ or digitally by means of an integrating digital voltmeter 51 of relatively low damping (shown as $C_2$) with a printout 52, or both, as illustrated. These recording devices of course provide a continuous gravity profile, as described, for example, in the previously mentioned copending applications.

Since the digital voltmeter illustrated can record only positive or negative measured values, the voltage base is shifted in this circut by means of a stable auxiliary direct voltage 53 so that the variations in voltage here do not cross the zero line.

With proper polarity and amplification the weight or mass does not deflect substantially, but is essentially locked, any mechanical force which tends to deflect it being enhanced by the opposing electromagnetic force. As in all degenerative feedback controls, a very slight deflection will inherently occur, of course. However, this deflection is completely negligible as compared with the excursion which occurs without this control arrangement and the change in force exerted by the springs 2 and 3 is completely negligible. This balance-locking method accordingly requires little magnetic damping, because there can be no oscillation requiring damping. Therefore, the time for reaching equilibrium of the measuring element can be kept extremely short, of the order of only a few seconds, even though large-amplitude oscillations of the base at even relatively low frequency are suppressed in the indication. Another advantage is the complete absence of any torque produced by horizontal accelerations, which can only occur when the mass can deviate substantially from its zero position. Moreover, a gravimeter controlled in the present manner is completely linear in calibration to a much greater extent than an instrument whose mass deflects substantially for a measurement. Due to the complete linearity of the gravimeter controlled in the manner described, the useful measuring range is also considerably increased. While formerly a linear calibration of ±100 gal. could be reached only with difficulty, the present instrument can cover ±400 gal. or more, depending on the "hardness" of the control (i.e., the feedback loop gain).

It may be observed that calibration testing of the present gravimeter does not require such complexities as an expensive "sine lift" (a mechanical arrangement for the generation of vertical, periodic accelerations of various amplitudes and frequencies). A Cardanic suspension of the gravimeter on a spiral spring with the gravimeter oscillating at its natural period of oscillation is sufficient for the purpose. For instance, at a period of 2 seconds a periodic acceleration of ±400 gal. is attained at an amplitude of only ±40 cm. A "lift" more than 20 meters high would be necessary for a similar test with conventional damped constructions. The periods of oscillatory motion of a boat are around 10 seconds, and since ordinary gravimeters are frequency-dependent with regard to the damping attenuation, the test would have to be carried out with a period of 10 seconds instead of at 1 or 2 seconds, which is permissible when the measuring balance is locked in accordance with the invention. Furthermore, the testing of the gravimeter by means of free oscillation of a spring is completely shockless, while mechanically operated sine lifts run relatively roughly as a result of the inevitable friction.

FIGURE 2 shows a similar arrangement to that of FIGURE 1, as regards the broader teachings of the invention. However, the position transducer 9 of the arrangement of FIGURE 1 is here replaced by a photoelectric position transducer. The extension 5 has an aperture diaphragm 20 which distributes a light beam, generated by a bulb 21 through an imaging lens 22, between photocells 23 and 24. The photocells 23 and 24 are arranged with their output voltages in a differential circuit so that with symmetrical exposure of the two cells the resulting output voltage is zero. Upon unsymmetrical exposure to light, the differential voltage changes in a positive or negative direction depending on the direction of movement of the diaphragm 20. The direct voltage is amplified by means of the amplifier 11A (with appropriate polarity provision) and used as earlier described. The voltage drop across a resistor 25 is again measured or recorded by means of an appropriate measuring device 26.

Many further variations will readily be devised by persons skilled in the art, both similar and dissimilar to the embodiments described above. Accordingly, the scope of the protection to be given the invention should not be determined on the basis of similarity or dissimilarity to the particular embdiments here shown, but on the basis of the structures of the invention as defined in the annexed claims.

In the claims:

1. A gravimeter for use on travelling vehicles, comprising support structure; a body constituting a gravimeter mass and having a lever portion pivotally mounted for rotatable movement relative to said structure about a horizontal axis; a group of filamentary constraining members of which each has one end attached to said body and the other end attached to said structure and which are arranged to jointly constrain said body to movements in a vertical plane; spring means disposed between said body and said structure for elastically biasing said body to a substantially horizontal null reference position in said plane; a controllable force-field device comprising magnet means of constant magnetomotive force mounted on said structure and having a field through which said body extends, said body having in said field a portion formed of non-magnetic and electrically conducting material for eddy-current damping of movements of said body, an excitation winding mounted on said body portion in said field; a position-responsive electric sensing device for providing an electrical measuring signal indicative of the positional departure of said body from said null reference position; an amplifier network having an input connected to said sensing device and having a direct-current output reversible in response to passage of said body through said null reference position, said output being connected to said winding for controlling said force-field device to counteract said positional departures; and electric measuring means connected and responsive to said output to furnish data indicative of changes in gravity acting upon said body.

2. In a gravimeter according to claim 1, said magnet means comprising two permanent magnets of U-configuration located on horizontally opposite sides of said body, each of said two magnets having its two pole faces located in a vertical plane one vertically above the other, whereby said two magnets form between each other two field gaps, said body portion being flat and extending substantially in a vertical plane through said two gaps, and said winding on said flat portion having respective perimetrically sequential portions extending through said two gaps.

3. A gravimeter comprising support structure; a body constituting a gravimeter mass and being pivotally mounted for pendulous movement relative to said structure about a horizontal axis; constraining means for restricting said body to movements in a vertical plane; spring means disposed between said body and said structure for elastically biasing said body to a substantially horizontal reference position in said plane; magnetic field means of constant magnetomotive force mounted on said structure, said body having a plate-shaped portion extending in a vertical plane through the field of said field means and being formed of non-magnetic and electrically conductive material for providing eddy current damping substantially proportional to the speed of positioned departure of said body from said reference position; an excitation winding mounted on said plate-shaped body portion and extending substantially parallel to said vertical plane and through said field; a position-responsive electric sensing device for providing an electrical measuring signal indicative of the positional departure of said body from said reference position; an amplifier network having an input connected to said sensing device and having an output reversible in response to passage of said body through said reference position and connected to said winding for exciting it to counteract said positional departures; and electric measuring means connected and responsive to said output to furnish data indicative of changes in gravity acting upon said body.

References Cited

UNITED STATES PATENTS

| | | | |
|---|---|---|---|
| 2,316,915 | 4/1943 | Truman | 73—382 |
| 2,367,126 | 1/1945 | James | 73—382 |
| 2,786,101 | 2/1957 | Kinkel | 73—398 |
| 3,066,255 | 11/1962 | Westphal | 73—382 X |
| 2,136,219 | 11/1938 | Scherbatskoy | 73—382 |
| 2,304,324 | 12/1942 | Williams | 73—382 |
| 2,853,287 | 9/1958 | Draper et al. | 73 |
| 2,923,904 | 2/1960 | Hieber. | |
| 3,019,655 | 2/1962 | Graf | 73—382 |
| 3,176,521 | 4/1965 | Clark | 73—517 |
| 3,211,003 | 10/1965 | Worden | 73—382 |
| 3,323,372 | 6/1967 | Kistler et al. | 73—517 |

JAMES J. GILL, *Primary Examiner.*